(12) United States Patent
Large et al.

(10) Patent No.: US 12,175,996 B2
(45) Date of Patent: *Dec. 24, 2024

(54) CONTROLLER FOR VISUAL DISPLAY OF MUSIC

(71) Applicant: OSCILLOSCAPE, LLC, East Hartford, CT (US)

(72) Inventors: Edward W. Large, East Hartford, CT (US); Ji Chul Kim, East Hartford, CT (US)

(73) Assignee: Oscilloscape, LLC, East Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,253

(22) Filed: Oct. 19, 2022

(65) Prior Publication Data

US 2023/0041100 A1 Feb. 9, 2023

Related U.S. Application Data

(63) Continuation of application No. 16/437,710, filed on Jun. 11, 2019, now Pat. No. 11,508,393.

(60) Provisional application No. 62/684,055, filed on Jun. 12, 2018.

(51) Int. Cl.
| | | |
|---|---|---|
| G10L 15/00 | (2013.01) |
| A63J 17/00 | (2006.01) |
| G06N 3/04 | (2023.01) |
| G10L 25/30 | (2013.01) |
| G10L 25/51 | (2013.01) |
| A63J 5/02 | (2006.01) |
| G06N 3/08 | (2023.01) |

(52) U.S. Cl.
CPC ............... *G10L 25/30* (2013.01); *A63J 17/00* (2013.01); *G06N 3/04* (2013.01); *G10L 25/51* (2013.01); *A63J 5/02* (2013.01); *G06N 3/08* (2013.01); *G10H 2210/066* (2013.01); *G10H 2210/071* (2013.01)

(58) Field of Classification Search
CPC ........... G10H 1/368; G10H 7/00; G06F 3/167
See application file for complete search history.

(56) References Cited

U.S. PATENT DOCUMENTS

| | | |
|---|---|---|
| 6,177,623 B1 | 1/2001 | Ooseki |
| 6,225,545 B1 | 5/2001 | Hideo et al. |
| 7,116,328 B2 | 10/2006 | Kawai et al. |
| 7,376,562 B2 | 5/2008 | Large |

(Continued)

FOREIGN PATENT DOCUMENTS

CN 108305604 7/2018

OTHER PUBLICATIONS

Lerud, K. D., Kim, J. C., Almonte, F. V., Carney, L. H., & Large, E. W. (2016b). A canonical oscillator model of cochlear dynamics, 380, 100-107.

(Continued)

*Primary Examiner* — Daniel Abebe
(74) *Attorney, Agent, or Firm* — Foley & Lardner LLP

(57) ABSTRACT

Systems and methods for visualizations of music may include one or more processors which receive an audio input, and compute a simulation of a human auditory periphery using the audio input. The processor(s) may generate one or more visual patterns on a visual display, according to the simulation, the one or visual patterns synchronized to the audio input.

20 Claims, 3 Drawing Sheets

(56) References Cited

U.S. PATENT DOCUMENTS

| | | | | |
|---|---|---|---|---|
| 7,451,077 | B1* | 11/2008 | Lindau | G10L 21/06 |
| | | | | 704/203 |
| 7,601,904 | B2 | 10/2009 | Dreyfuss et al. | |
| 8,583,442 | B2 | 11/2013 | Large | |
| 8,706,274 | B2 | 4/2014 | Kobayashi | |
| 8,930,292 | B2 | 1/2015 | Large | |
| 9,514,786 | B2* | 12/2016 | Huang | G11B 27/11 |
| 9,736,603 | B2* | 8/2017 | Osborne | G16H 50/20 |
| 10,108,395 | B2* | 10/2018 | Torrini | G06F 3/165 |
| 10,325,627 | B2 | 6/2019 | Ikeda et al. | |
| 10,978,033 | B2* | 4/2021 | Lathrop | G10G 1/02 |
| 2012/0259634 | A1 | 10/2012 | Tsunokawa | |
| 2015/0155006 | A1 | 6/2015 | Chou et al. | |
| 2020/0286505 | A1* | 9/2020 | Osborne | G06N 3/08 |
| 2021/0249032 | A1 | 8/2021 | Smith et al. | |
| 2021/0295811 | A1* | 9/2021 | Lathrop | G10G 1/02 |

OTHER PUBLICATIONS

Meddis, R. (1986). Simulation of mechanical to neural transduction in the auditory recepter. Journal of the Acoustical Society of America, 79(3), 702-711.

Meddis, R., & O'Mard, L. P. (2006). Virtual pitch in a computational physiological model. The Journal of the Acoustical Society of America, 120(6), 3861-3869. doi: papers2://publication/uuid/C44D129E-23E4-40ED-86F1-DC65B9494343.

Muller, M., Ellis, D. P. W., Klapuri, A., & Richard, G. (2011). Signal Processing for Music Analysis. [10.1109/JSTSP.2011.2112333]. IEEE Journal of Selected Topics in Signal Processing, 5(6), 1088-1110.

Palmer, S. E., Langlois, T. A., & Schloss, K. B. (2016). Music-to-Color Associations of Single-Line Piano Melodies in Non-synesthetes. Multisensory research, 29(1-3), 157-193.

Palmer, S. E., Schloss, K. B., Xu, Z., & Prado-León, L. R. (2013). Music-color associations are mediated by emotion. [10.1073/pnas.1212562110]. Proceedings of the National Academy of Sciences USA, 110(22), 8836-8841.

Zilany, M. S., & Bruce, I. C. (2006). Modeling auditory-nerve responses for high sound pressure levels in the normal and impaired auditory periphery. Journal of the Acoustical Society of America, 120(3), 1446.

Humphrey, E. J., Bello, J. P., & LeCun, Y. (2013). Feature learning and deep architectures: new directions for music informatics. Journal of Intelligent Information Systems, 41(3), 461-481. doi: 10.1007/s10844-013-0248-5.

Bruce, I. C., Sachs, M. B., & Young, E. D. (2003). An auditory-periphery model of the effects of acoustic trauma on auditory nerve responses. The Journal of the Acoustical Society of America, 113(1), 369-388.

Chapin, H., Jantzen, K. J., Kelso, J. A. S., Steinberg, F., & Large, E. W. (2010). Dynamic emotional and neural responses to music depend on performance expression and listener experience. PLoS One, 5(12), e13812.

Egulluz, V. M., Ospeck, M., Choe, Y., Hudspeth, A. J., & Magnasco, M. O. (2000). Essential Nonlinearities in Hearing. Physical Review Letters, 84(22), 5232.

Humphrey, E. J., Bello, J. P., & LeCun, Y. (2013). Feature learning and deep architectures: new directions for music informatics. [10.1109/MMUL.2011.34]. Journal of Intelligent Information Systems, 41(3), 461-481. doi: papers2://publication/doi/ 10.1109/MMUL.2011.34.

Isbilen, E. S., & Krumhansl, C. L. (2016). The color of music: Emotion-mediated associations to Bach's Well-tempered Clavier. [10.1037/pmu0000147]. Psychomusicology: A Journal of Research in Music Cognition, 26(2), 149-161. doi: papers2:// publication/doi/ 10.1037/pmu0000147.

Juslin, P. N. (2000). Cue utilization in communication of emotion in music performance: relating performance to perception. Journal of Experimental Psychology: Human Perception and Performance, 26(6), 1797-1813.

Kim, Y. E., Schmidt, E. M., Migneco. R., Morton, B. G., Richardson, P., Scott, J., . . . Turnbull, D. (2010). Music Emotion Recognition: A State of the Art Review. Paper presented at the 11th International Society for Music Information Retrieval Conference (ISMIR 2010).

Large, E. W. (2015). Learning and auditory scene analysis in gradient frequency nonlinear oscillator networks. U.S. Pat. No. 8,930,292. Jan. 6, 2015.

Large, E. W. (2013). Rhythm processing and frequency tracking in gradient fre-quency nonlinear oscillator networks. U.S. Pat. No. 8,583,442. Nov. 12, 2013.

Large, E. W. (2008) Method and apparatus for nonlinear frequency analysis of structured acoustic signals. U.S. Pat. No. 7,376,562, May 20, 2008.

Lerud, K. D., Almonte, F. V., Kim, J. C., & Large, E. W. (2014). Mode-locking neurodynamics predict human auditory brainstem responses to musical intervals. Hearing Research. doi: papers2://publication/doi/ 10.1016/j.heares.2013.09.010.

Lerud, K. L., Kim, J. C., & Large, E. W. (2016). GrFNN Brainstem: An oscillatory model of the auditory periphery and brainstem, from https://github.com/MusicDynamicsLab/GrFNNBrainstem.

Bello, J. P., Daudet, L., Abdallah, S., Duxbury, C., Davies, M., & Sandler, M. B. (2005). A tutorial on onset detection in music signals. IEEE Transactions on Speech and Audio Processing, 13(5), 1035-1047. doi: 10.1109/TSA.2005.851998.

Benetos, E., Dixon, S., Giannoulis, D., Kirchhoff, H., & Klapuri, A. (2013). Automatic music transcription: challenges and future directions. Journal of Intelligent Information Systems, 41(3), 407-434. doi: 10.1007/s10844-013-0258-3.

Gouyon, F., & Dixon, S. (2005). A Review of Automatic Rhythm Description Systems. Computer Music Journal, 29(1), 34-54. doi: 10.1162/comj.20.

McVicar, M., Santos-Rodriguez, R., Ni, Y., & Bie, T. D. (2014). Automatic chord estimation from audio: A review of the state of the art. IEEE/ACM Transactions on Au-dio, Speech, and Language Processing, 22(2), 556-575. doi: 10.1109/TASLP.2013.2294580.

Humphrey, E. J., Bello, J. P., & LeCun, Y. (2013). Feature learning and deep architectures: new directions for music informatics. [10.1109/MMUL.2011.34]. Journal of Intelligent Information Systems, 41(3), 461-481. doi: papers2://publication/doi/ 0.1109/MMUL.2011.34.

* cited by examiner

CONTROLLER FOR VISUAL DISPLAY OF MUSIC

CROSS-REFERENCE TO RELATED APPLICATIONS

This application is a continuation of U.S. patent application Ser. No. 16/437,710, filed Jun. 11, 2019, which claims the benefit of U.S. Provisional Patent Application Ser. No. 62/684,055, filed Jun. 12, 2018, the entireties of each of which are incorporated herein by reference in their entirety.

FIELD OF THE DISCLOSURE

The present invention relates generally to the visual display of music, and more particularly to a device that controls visual display based on automatic inference of perceptual and emotional features of music to which humans are sensitive.

BACKGROUND

Synchronizing visual displays with musical recordings or musical performances is well-known. In the prior art, various types of visual displays are controlled so as to coordinate with music. Examples are 1) simple, inexpensive music reactive LED strips or light panels that respond to sound amplitude in real time linear transformation, and 2) complex lights shows at professional concerts, clubs, or hotels where lights, fireworks, water jets or other displays are choreographed to music in a prearranged pattern, or under human control.

In the prior art, simple lighting controllers react directly to features of sound vibration. These systems may perform linear transformations of sound, such as frequency analysis (e.g., filtering or Fourier analysis), however the mapping of audio signals to light is direct: the lights get brighter as sound gets louder, for example, in some instances in multiple frequency bands (so-called color organs). Alternatively, complex lights shows at professional venues typically require that each show is custom-programmed in advance (e.g., using a DMX controller), requiring sophisticated programming to respond to specific musical pieces, and this may include input that is generated from onstage musical controllers. Light shows at professional venues may also include real-time control by a human lighting designer who is able to respond to perceived musical structures, feelings and emotions. The latter options are expensive and labor intensive.

For certain effects of light/music interplay, real-time control by a human is required so that visualizations can respond to perceived musical structures, feelings, and emotions. Such an outcome cannot be achieved by direct, linear mappings from sound, because musical structures, feeling and emotions are not simple, linear transformations of sound. Human-perceived musical structures, feelings, and emotional responses are 'inferences' from the audio surface, computed by neural networks in the human brain.

Examples include perceiving individual instruments and timbres in a complex musical surface, perceiving the pulse, or basic beat, of a musical rhythm, perceiving the metrical structure of a rhythm, perceiving the pitch of an individual note, perceiving consonance and dissonance of musical intervals, perceiving the harmonic progression a song, perceiving the key of a musical work. and understanding whether the music is happy or sad, energetic or relaxed. While the prior art has developed human control systems, they are limited in the complexity and speed of response, in that they are expensive and labor intensive, and automated devices only react in a linear fashion; unable to truly mimic human response to music in a visual manner.

Therefore, what is needed is a device for visual display of music that is capable of inferring such perceptions that overcomes these shortcomings.

SUMMARY

The present invention is directed to a controller having a music analysis module that processes music to infer perceived musical features, musical structures, feelings, and emotions, and a display control module that translates the musical features into visual displays. The music analysis module includes a plurality of artificial intelligence and neural network circuits that can recover musical structures, including but not limited to tonal features such as pitch, consonance/dissonance, harmony, tension/relaxation, tonality, and key, timbral features, such as envelope, onset, attack time, spectral centroid and spectral flux, rhythmic features such as pulse, meter, tempo, rate, and rhythmic pattern, and structural features such as verse, chorus, and song endings. The music analysis module also provides a means for using these structures to determine affect parameters such as arousal (energetic/relaxed) and valence (positive/negative), and emotional responses such as happy, sad, and fearful. The display control module includes a means for driving visual displays, including but not limited to light sources, water jets, pyrotechnics, animated characters, and mechanical devices (e.g., robots), in response to an electrical signal. The music analysis module is operatively coupled with the display control module, and provides signals that encode the musical features that the display control module can use to control the visual display.

DETAILED DESCRIPTION

Figure 1:
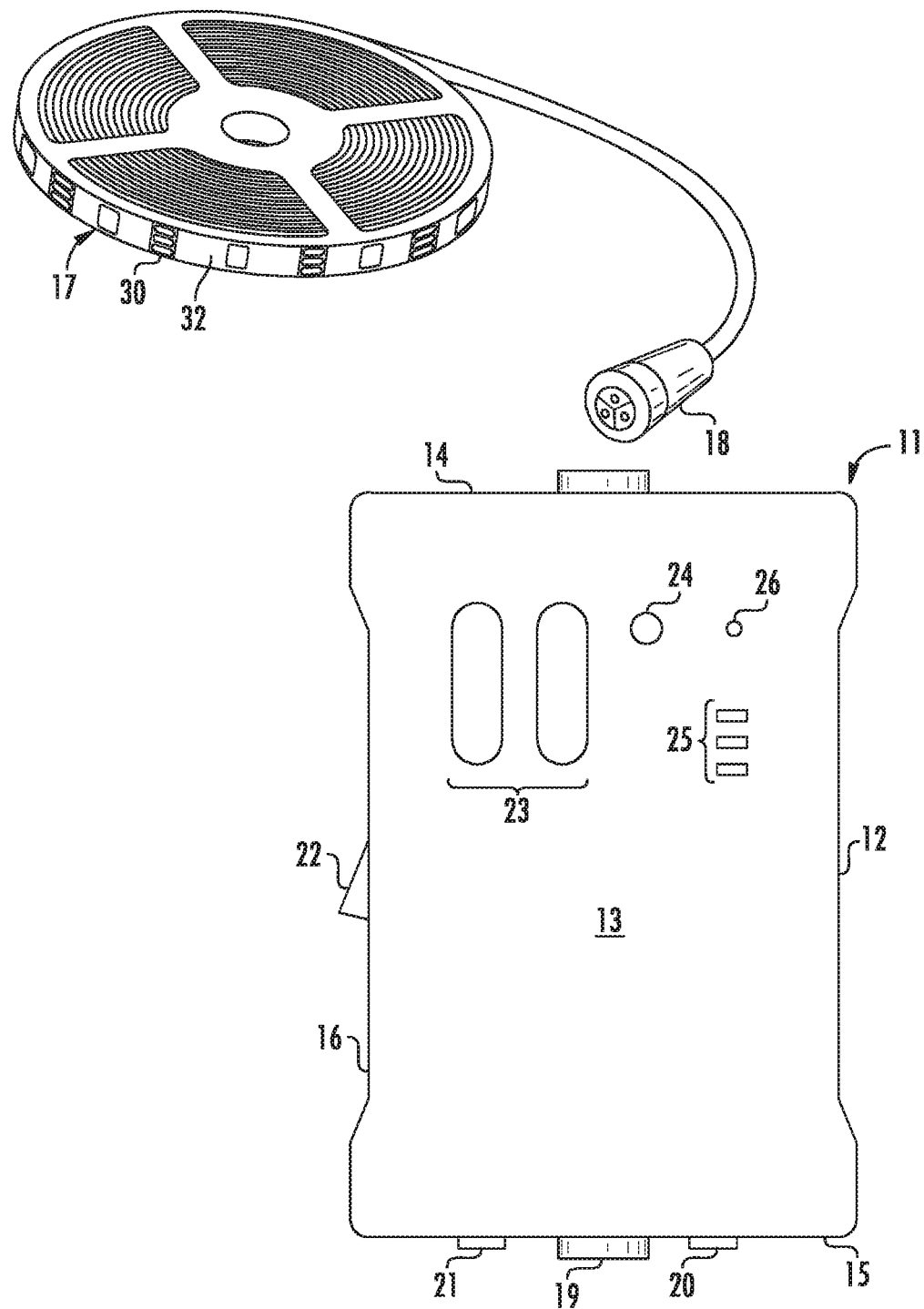
FIG. 1 is a schematic view of a device for control of light displays based on inference of perceptual and emotional features of music constructed in accordance with the invention.

Referring now in detail to the drawings, and initially to FIG. 1, a control device 11 (also "controller") that controls a light display based on automatic inference of perceptual and emotional features of music is shown. As shown, the control device 11 includes a housing 12 having a front surface or face 13, and top 14, bottom 15, and side 16 surfaces. The housing 12 and surfaces 13-16 may be made of any suitable material, such as plastic.

A visual display 17, illustrated by way of non-limiting example as a linear array of LEDs, are connected via a connector 18 to an output (not shown) on the top surface 14 of controller 11. The visual display 17 may comprise a series of 1 to 1000, for example, light emitting diodes (LEDs) 30. The LEDs 30 may be mounted on a strip, string, or panel 32, for example, and are connected to the device. Individually addressable LEDs 30 are preferred as they provide a brilliant light source, can be addressed to create many different visual patterns, and are long-lasting. However, if desired, other light sources may be used. Moreover, other forms of visual display 17 may be controlled, including but not limited to pyrotechnics, water jets, animated characters, and robots, for example.

Additionally, the bottom face 15 may include a power connector 19 and an audio input jack 20, and USB port 21, and the side face 16 includes an on-off switch 22. The front face includes one or more mode switches 23, one or more system control buttons 24, one or more system status indicators 25, and a microphone 26. The on-off switch 22 will turn the control device 11 on and off The mode switches 23 are used to select between different modes of response depending upon the listener's choice. For example, one switch may control the type of pattern to be displayed, and the other may control the color palate.

A microphone 26 is provided, in addition to, or instead of, audio input 20, to couple the controller 11 to inputs from any ambient audio source, such as a live musical performance or an audio recording. Other suitable methods of coupling may be used in place of the microphone 26. For example, the audio input 20 on the bottom face 15 may be used to feed audio directly to the controller 11. This signal may originate from a personal mobile device (e.g., a mobile phone or tablet), a DJ sound system, or a musical instrument or mixing board.

Figure 2:
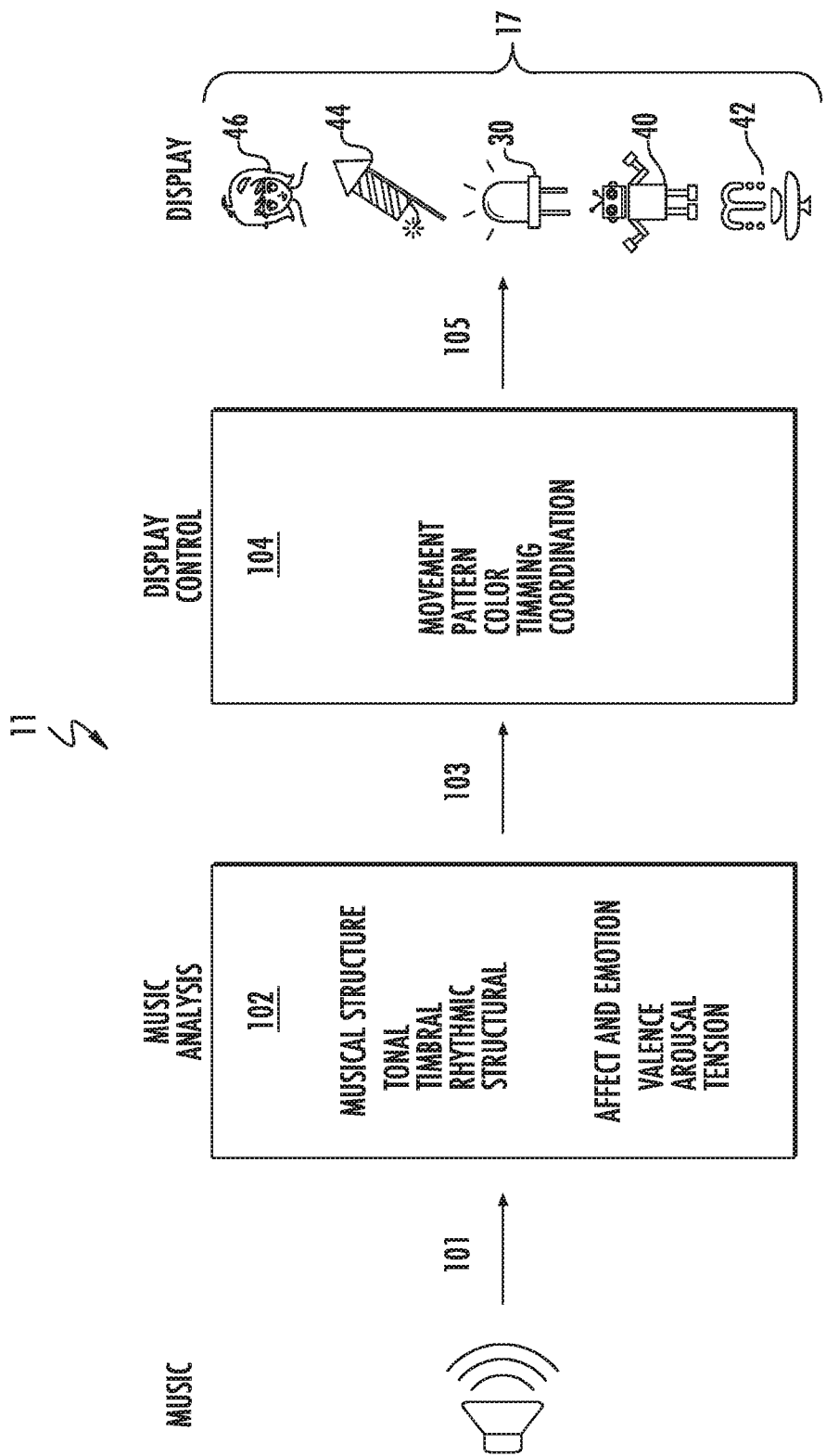
FIG. 2 is a diagram illustrating an artificial intelligence music analysis module for simulating perception of musical structures, feelings, and emotions, and a display control module for controlling visual displays according to the present invention.

Referring now to FIG. 2, a musical signal 101 is provided as input to a music analysis module 102 of controller 11. The music analysis module 102 may consist of a hardware and/or software for computing musical structures, feelings, and emotional interpretations such as perceived by humans when listening to music. The music analysis may take place on an embedded system (e.g., a Raspberry Pi), a mobile device (e.g., a phone our tablet), a personal assistant device (e.g., Echo or Google Home), dedicated lighting hardware (e.g. a DMX controller, or a general purpose computer, whether on-site or in the cloud. Such music analysis algorithms are well-known in the art (e.g., Humphrey, Bello, & LeCun, 2013; Kim et al., 2010; Muller, Ellis, Klapuri, & Richard, 2011), and may include neural networks, nonlinear oscillators, hidden Markov models, pattern matching algorithms, and statistical analyses. Such techniques may further employ learning procedures, such as back-propagation, Hebbian plasticity, and statistical learning techniques; in effect artificial intelligence.

Next, the music analysis is communicated via a connection 103 to the display control module 104. This connection may be via software, a hardware serial bus, or a wireless technology such as Bluetooth or Wi-Fi, for example. The music analysis provides input to a the display control module 104, which, in response to the signal created by music analysis module 102, computes patterns of light, movement, animated movement, flow, or flight, for example, designed to visually convey and/or amplify perceived musical structures, feelings, and emotions.

Finally, the display control signal is communicated via a connection 106 to a display platform. This connection may be via software, a physical wire or wires, or via a wireless technology such as Bluetooth or Wi-Fi 33, for example. A display platform 106 is provided that is capable of decoding the signals and producing the appropriate visual displays 17. For example, the display might be in the form of patterns of LED light 30, patterns of stage lighting, movement of animated characters 46, movement of robotic mechanical devices 40, launching of fireworks 44, or sprays of water jets 42.

Figure 3:
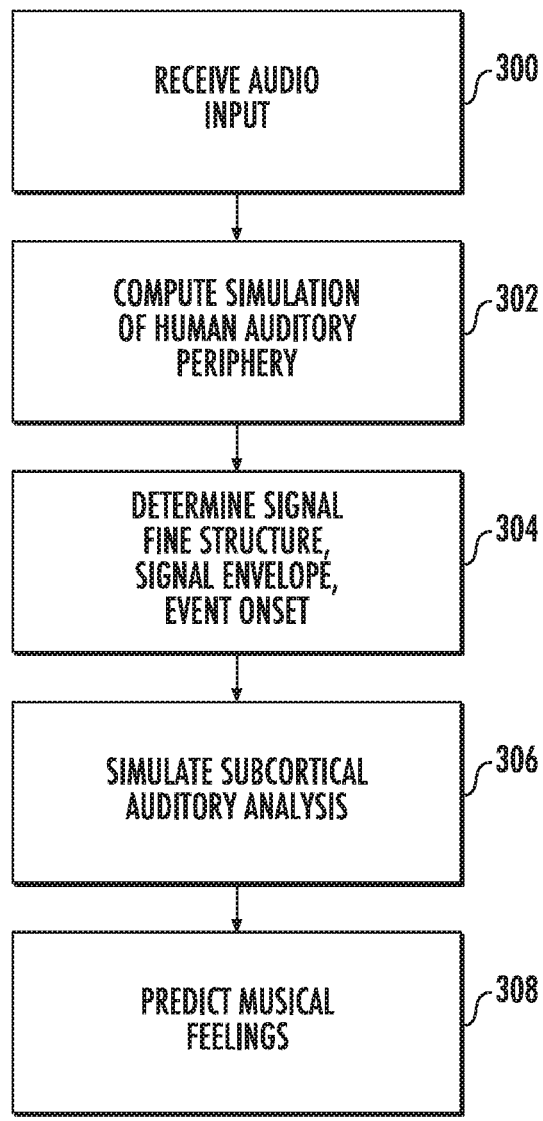
FIG. 3 is a flowchart of operation of the device for control of visual displays in accordance with the invention.

We next reference FIG. 3 in which operation of a preferred embodiment, which is not meant to restrict the scope of the invention, is provided as a concrete example. In the preferred embodiment, a music signal 101 is provided as input in a step 300, via a microphone 26 or an input jack 20, for example, to a music analysis module, running on a system-on-a-chip (Allwinner H3). In the initial stage of processing, in a step 302, the music analysis module 102 computes a simulation of the human auditory periphery. This may include for example, simulation of the human middle ear by filtering as well simulation of the human cochlea by nonlinear filtering, using methods are known in the art (e.g., Bruce, Sachs, & Young, 2003; Eguiluz, Ospeck, Choe, Hudspeth, & Magnasco, 2000; Lerud, Almonte, Kim, & Large, 2014; Lerud, Kim, & Large, 2016b; Zilany & Bruce, 2006).

In a step 304, the signal fine structure, signal envelope, and event onsets, pitch, and timbral features are computed using nonlinear networks that simulate processing in the human auditory nerve, cochlear nucleus, lateral lemniscus, and inferior colliculus. These methods are known in the art and include simulations of individual neurons and small neural populations (see, e.g., Lerud et al., 2014; Lerud, Kim, & Large, 2016a; Meddis, 1986; Meddis & O'Mard, 2006).

These signals are then passed in a step 306 to one or more networks intended to simulate cortical analysis. These networks may include neural oscillator networks (Large patent, 2008), which utilize real-time Hebbian plasticity algorithms (Large patent 2015), and specialized techniques for processing rhythmic features (Large patent 2013). As a whole, the musical structures computed by such the aforementioned simulations of peripheral, subcortical, and cortical neural networks may include, but are not limited to, tonal (e.g., pitch, consonance, harmony, tonality), timbral (e.g., envelope, attack, brightness, spectral flux, instrument identification), rhythmic (e.g., pulse, meter, complexity, rate), and structural (e.g., verse, chorus, song ending) features. In effect, the new combination of such analysis can predict perceived musical features, feeling and emotions.

In a next step 308 of analysis, musical features are used to predict musical feelings (affect) and emotions that are likely to be experienced by humans when listening to the same musical piece. In this step, the structural features are input to a neural network that is trained to reproduce mappings from musical structure to experienced affect and emotion that can measured in human experiments (Chapin, Jantzen, Kelso, Steinberg, & Large, 2010; Isbilen & Krumhansl, 2016; Juslin, 2000; Kim et al., 2010; Palmer, Langlois, & Schloss, 2016; Palmer, Schloss, Xu, & Prado-Leon, 2013) These may include arousal (i.e., relaxed/excited), valence (i.e., positive/negative), and emotion categories (e.g., happiness, sadness, fear), for example.

Finally, as a result of the inventive structure and processing computation of musical structures, feelings, and emotions now takes place in real-time and is predictive, so that visual display can be synchronized and coordinated with the music.

Without human intervention, and in a more complex manner, in a step 310, the output 103 of music analysis module 102 is output as encodings of musical features to a display control module 104. Display control module 104 is capable of determining, based on the input musical features, the patterns, movements, colors, saturation, brightness, and other visual changes, for example. These patterns determined in by direct mapping to of musical features to features of predetermined visual patterns, or by neural networks that are trained to produce such mappings. Visual displays are controlled by a master clock, internal to the display controller, so that control signals synchronized and coordinated in a predictive fashion in real time with the music that is being heard. Signals from the music analysis module reset the display clock from time to time based on the musical rhythms and rhythm structures. Control signals are sent to the visual display in real-time so that visual sensations are synchronized and coordinated with the music that is being heard.

We claim:

1. A system comprising:
a music analysis module configured to:
  receive an audio input; and
  compute a simulation of a human auditory periphery using the audio input, wherein the simulation comprises a mapping of structural features of the audio input to a predicted affect to the human auditory periphery; and
a display control module operatively coupled to the music analysis module, the display control module configured to:
  receive data corresponding to the simulation of the human auditory periphery from the music analysis module; and
  generate one or more visual patterns on a visual display, according to the simulation, the one or more visual patterns synchronized to the audio input.

2. The system of claim 1, wherein the audio signal comprises a music signal, and wherein the one or more visual patterns are synchronized and coordinated with the music signal, for synchronized musical and visual output.

3. The system of claim 1, further comprising a display platform comprising the visual display, the display platform communicably coupled to the display control module, the display platform configured to receive one or more signals corresponding to the one or more visual patterns, for rendering the one or more visual patterns on the visual display.

4. The system of claim 1, wherein the human auditory periphery comprises at least one of a cochlear nucleus, a lateral lemniscus, an inferior colliculus, a middle ear, a cochlea, or an auditory nerve.

5. The system of claim 4, wherein the music analysis module is configured to compute the simulation of the human auditory periphery based on at least one of a signal fine structure, signal envelop, event onsets, pitch, tonal, timbral, rhythmic, or structural features of the audio input.

6. The system of claim 1, wherein the one or more visual patterns comprise visual changes of at least one of a pattern, movement, color, saturation, or brightness.

7. The system of claim 1, wherein the audio signal is received from at least one of a microphone or an audio feed.

8. The system of claim 1, wherein the music analysis module computes the simulation using at least one of a neural network, neuron simulations of individual neurons or small neural populations, nonlinear oscillators, hidden Markov Models, pattern matching algorithms or statistical analyses.

9. The system of claim 1, wherein the musical analysis module is further configured to determine a perceived structure, an affect and an emotion as a function of the audio input, wherein the one or more visual patterns correspond to the simulation and the perceived structure, the affect, and the emotion.

10. A method comprising:
receiving, by an audio analysis module, an audio input;
computing, by the audio analysis module, a simulation of a human auditory periphery using the audio input, wherein the simulation comprises a mapping of structural features of the audio input to a predicted affect to the human auditory periphery;
receiving, a display control module from the audio analysis module, data corresponding to the simulation of the human auditory periphery; and
generating, by the display control module, one or more visual patterns on a visual display according to the simulation, the one or more visual patterns synchronized to the audio input.

11. The method of claim 10, wherein the audio signal comprises a music signal, and wherein the one or more visual patterns are synchronized and coordinated with the music signal, for synchronized musical and visual output.

12. The method of claim 10, further comprising receiving, by a display platform comprising the visual display, one or more signals corresponding to the one or more visual patterns from the display control module, for rendering the one or more visual patterns on the visual display.

13. The method of claim 10, wherein the human auditory periphery comprises at least one of a cochlear nucleus, a lateral lemniscus, an inferior colliculus, a middle ear, a cochlea, or an auditory nerve.

14. The method of claim 13, wherein computing the simulation of the human auditory periphery is based on at least one of a signal fine structure, signal envelop, event onsets, pitch, tonal, timbral, rhythmic, or structural features of the audio input.

15. The method of claim 10, further comprising transmitting, by display control module to a display platform comprising the visual display, one or more signals corresponding to the one or more visual patterns, the one or more signals causing the display platform to control the visual display to render the one or more visual patterns.

16. The method of claim 10, further comprising rendering, by the visual display, the one or more visual patterns while the audio input is output.

17. The method of claim 10, wherein computing the simulation comprises computing, by the music analysis module, the simulation of the human auditory periphery for the audio input using at least one of a neural network, neuron simulations of individual neurons or small neural populations, nonlinear oscillators, hidden Markov Models, pattern matching algorithms or statistical analyses.

18. The method of claim 10, further comprising:
determining, by the audio analysis module, a perceived structure, an affect and an emotion as a function of the audio input,
wherein the one or more visual patterns correspond to the simulation and the perceived structure, the affect, and the emotion.

19. A controller comprising:
one or more processors configured to:
  receive an audio input;
  compute a simulation of a human auditory periphery using the audio input, wherein the simulation comprises a mapping of structural features of the audio input to a predicted affect to the human auditory periphery; and
  generate one or more visual patterns on a visual display according to the simulation, the one or more visual patterns synchronized to the audio input.

20. The controller of claim 19, wherein the audio signal comprises a music signal, and wherein the one or more visual patterns are synchronized and coordinated with the music signal, for synchronized musical and visual output.

* * * * *